United States Patent
Gnanamani et al.

(10) Patent No.: US 10,915,513 B2
(45) Date of Patent: Feb. 9, 2021

(54) ARCHIVAL OF DATA IN A RELATIONAL DATABASE MANAGEMENT SYSTEM USING BLOCK LEVEL COPY

(71) Applicant: International Business Machines Corporation, Armonk, NY (US)

(72) Inventors: Senthil Nathan Gnanamani, Chennai (IN); Gnanam Badhmanaban Kothandaraman, Chennai (IN); Sriram Lakshminarasimhan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 15/214,870

(22) Filed: Jul. 20, 2016

(65) Prior Publication Data

US 2018/0025034 A1    Jan. 25, 2018

(51) Int. Cl.
*G06F 16/30* (2019.01)
*G06F 16/21* (2019.01)
*G06F 16/22* (2019.01)

(52) U.S. Cl.
CPC ........ *G06F 16/219* (2019.01); *G06F 16/2272* (2019.01)

(58) Field of Classification Search
CPC .................... G06F 17/30309; G06F 16/30309
USPC ........................................................ 707/673
See application file for complete search history.

(56) References Cited

U.S. PATENT DOCUMENTS

| | | | |
|---|---|---|---|
| 8,260,813 B2 | 9/2012 | Coldicott et al. | |
| 8,825,604 B2 | 9/2014 | Draese et al. | |
| 2006/0020605 A1* | 1/2006 | Chan | G06F 16/22 |
| 2010/0332401 A1* | 12/2010 | Prahlad | G06F 3/0649 |
| | | | 705/80 |
| 2014/0095438 A1 | 4/2014 | Marwah et al. | |
| 2014/0130040 A1* | 5/2014 | Lemanski | G06F 9/4856 |
| | | | 718/1 |
| 2014/0201161 A1 | 7/2014 | Kumarasamy et al. | |
| 2017/0060890 A1* | 3/2017 | Booman | G06F 16/211 |

FOREIGN PATENT DOCUMENTS

| | | |
|---|---|---|
| EP | 1237086 A2 | 9/2002 |
| WO | 2013123831 A1 | 8/2013 |

OTHER PUBLICATIONS

"Lagged Backup—A Method and System to Enable Backup/Achieve System Resource Usage Automatic Adjustment Over Time", An IP.com Prior Art Database Technical Disclosure, IP.com No. 000203023; Jan. 2011.

* cited by examiner

*Primary Examiner* — Irete F Ehichioya
*Assistant Examiner* — Johnese T Johnson
(74) *Attorney, Agent, or Firm* — Brown & Michaels, PC; Christopher Pignato

(57) ABSTRACT

Archiving data in a relational database management system through a process in which an invisible index is created for each primary index of a data. When an input is received to initiate block copy of data to be archived; the data tables are locked and the identified blocks of data form the data table are block copied to an archive table. The invisible index is updated to correspond to the data table which had data archived. The primary index is then swapped with the invisible index and the data tables are unlocked. Data blocks from the main table which were copied into the archival table is deleted along with the old primary index.

20 Claims, 5 Drawing Sheets

ARCHIVAL OF DATA IN A RELATIONAL DATABASE MANAGEMENT SYSTEM USING BLOCK LEVEL COPY

BACKGROUND

The present invention relates to relational database management systems, and more specifically to archival of relational database management system data using block level copy.

Archival of historical data in relational database management systems (RDBMS) is a time consuming process where the majority of data archival in a RDBMS is based on a date/timestamp.

In existing approaches to archiving historical data in RDBMS, archive data is identified, selected and copied to a new archive location on a row by row basis using SQL or PL/SQL programs. Once the data is copied to new location, the archived data will be deleted from the source table.

Alternatively, data in a table of the RDBMS is partitioned on a date/time stamp basis. Old partitions become candidates for archiving. Data is moved from old partitions, and partition boundaries are redefined to accommodate new data.

In the conventional approaches to archiving historical data in RDBMS, the identification and movement of data on a row by row basis is a slow and time consuming process. Indexes become unusable until archived data is accounted for, which necessitates a rebuilding of the index, which further prolongs the outage window for the database. During the archival process, performance issues may occur as a result of high CPU consumption and memory utilization. Data needs to be locked out for the entire duration of the archival process, thereby causing contention issues to other applications. Furthermore, there is a need for extensive human intervention in terms of setting up of SQL or PL/SQL scripts, operation, monitoring and maintenance of the archival process.

Archival of historical data in RDBMS has numerous constraints. For example, archival of historical data in RDBMS causes a lengthy business outage window for the archival process, requires significant time spent in development of PL/SQL modules in some RDBMS and requires heavy resource (CPU, I/O) utilization driven by record level processing of data. Furthermore, the RDBMS is unaware of historical archive events, which leads to substantial manual effort during each archival event. Additionally, space is affected only after reorganization, after the archival of historical data, which requires additional business considerations.

In some conventional methods, asynchronous methods are used to keep an index updated to reduce down time during table or partition maintenance, which may include archiving. However, overheads are associated with keeping the index usable. For example, overhead is associated with scanning the index entries corresponding to the archived data and marking them as orphans. Furthermore, time is needed to read data from a table and rebuild an index. To rebuild an index, at least one full scan is required. Any updates that occur during the rebuild have to be applied from a journal with an outage to the tables. In a busy environment with high availability and concurrency requirements, it may not be possible to complete building all the global indexes of the table at the same instant.

SUMMARY

According to one embodiment of the present invention, a method of archiving data in a relational database management system is disclosed. The method comprising the steps of: a computer creating an invisible index for each primary index of a data table by copying data from the data table of the primary indexes that will not be archived; the computer updating both the primary index and invisible indexes based on changes to the data table until an input is received to initiate a block copy of data to be archived; the computer receiving an input to initiate block copy of data to be archived; the computer locking the data tables; the computer block copying identified blocks of data from the data table to an archive table and updating the invisible index to correspond to the data table; the computer swapping the primary index with the invisible index; the computer unlocking the data tables; the computer deleting data blocks from a main table which was copied into the archival table; and the computer deleting the primary index in which the invisible index was created from prior to archiving.

According to another embodiment of the present invention, a computer program product for archiving data in a relational database management system is disclosed. The computer program product including a computer comprising at least one processor, one or more memories, one or more computer readable storage media, the computer program product comprising a computer readable storage medium having program instructions embodied therewith. The program instructions executable by the computer to perform a method comprising: creating, by the computer, an invisible index for each primary index of a data table by copying data from the data table of the primary indexes that will not be archived; updating, by the computer, both the primary index and invisible indexes based on changes to the data table until an input is received to initiate a block copy of data to be archived; receiving, by the computer, an input to initiate block copy of data to be archived; locking, by the computer, the data tables; block copying, by the computer, identified blocks of data from the data table to an archive table and updating the invisible index to correspond to the data table; replacing, by the computer, the primary index with the invisible index; unlocking, by the computer, the data tables; deleting, by the computer, data blocks from a main table which was copied into the archival table; and deleting, by the computer, the primary index in which the invisible index was created from prior to archiving.

According to another embodiment of the present invention, a computer system for archiving data in a relational database management system is disclosed. The computer system comprising a computer comprising at least one processor, one or more memories, one or more computer readable storage media having program instructions executable by the computer to perform the program instructions. The program instructions comprising: creating, by the computer, an invisible index for each primary index of a data table by copying data from the data table of the primary indexes that will not be archived; updating, by the computer, both the primary index and invisible indexes based on changes to the data table until an input is received to initiate a block copy of data to be archived; receiving, by the computer, an input to initiate block copy of data to be archived; locking, by the computer, the data tables; block copying, by the computer, identified blocks of data from the data table to an archive table and updating the invisible index to correspond to the data table; replacing, by the computer, the primary index with the invisible index; unlocking, by the computer, the data tables; deleting, by the computer, data blocks from a main table which was copied into the archival table; and deleting, by the computer, the primary index in which the invisible index was created from prior to archiving.

DETAILED DESCRIPTION

Figure 1:
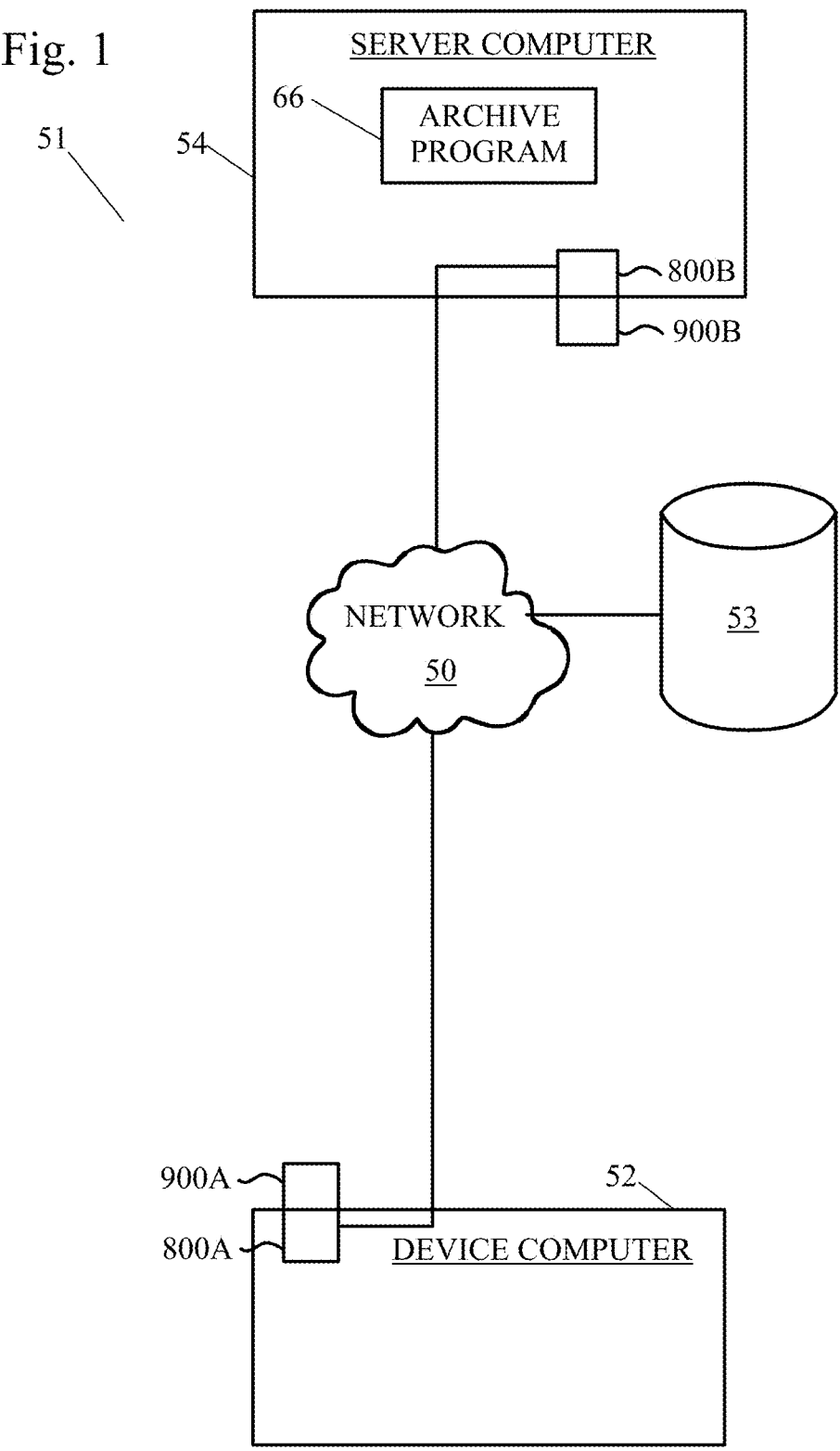
FIG. 1 depicts an exemplary diagram of a possible data processing environment in which illustrative embodiments may be implemented.

In an embodiment of the present invention, an infrastructure for an archival process utilizing block level copy at RDBMS level enables high speed archival. It will be recognized that the archival process of the present invention reduces the outage window required for archive processes and also results in a drastic reduction of manual effort. The archival process of the present invention is scalable to multi-table archival of data utilizing parent-child relationships with optimal system resource utilization.

The archival process of the present invention avoids record level processing by using RDBMS block level copy. Block information and corresponding ranges of data for columns are maintained in a system table.

The infrastructure to leverage block level copy is enabled by specifying one or more columns in one or more tables as archival keys as part of the table definition for each of the tables. The data in the table will be stored in sequence by the archival key, so that data can be archived in blocks based on the archive key. The value of the data in the column designated as an archival key is used to determine which data is to be archived.

Upon receiving a request to archive data, which might be a manual input or an automatic trigger based on a schedule, the system starts Phase I of the method (preparation for archiving).

The system table is referred to, to identify the archival key for the table. The value of the data in the archival key is used to identify blocks of data to be archived.

An "invisible index" is then created, which mirrors the all indexes for the table. The invisible index contains only active data that is not going to be archived and therefore accounts for data that is expected to remain in the table after the archival process.

The invisible index is maintained in parallel with the main index while the system waits for a trigger to initiate Phase II (the archiving of data).

Upon receiving the trigger to start Phase II, the table is locked in exclusive (read only) mode, so that the data in the table does not change during the archiving. The primary indexes can continue to be used during this time to access the data in the table for "read only" access.

The high speed archival process then does a block copy of the identified blocks of data to an archive table.

Once the copying of the data to the archival table is complete, the invisible indexes are swapped with the primary index counterparts and the original primary indexes are dropped or deleted. Once that is done, the table can be unlocked.

The data blocks in the table which were copied to the archival table can now be deleted from the table, and the old primary indexes can also be deleted. Then the invisible index is made the primary visible index. The space in the table occupied by the deleted data blocks can be marked for reuse, or the table can be compressed to eliminate the space formerly occupied by the deleted data blocks, as is common in the art.

It will be recognized that, in an embodiment of the present invention, the high speed archival process of the present invention provides many advantages. For example, the introduction of an "invisible index" build process prior to archiving reduces the outage window during which the table is unavailable for use. The ability to automatically remember historical archives is provided, since once data archival is complete, subsequent archives are automatically appended to the previously archived data store, providing options to create a single view of the transaction and archive data stores.

It should also be noted that the high speed archival process of the present invention works for all types of table spaces for all RDBMS. Furthermore, the high speed of archival achieved through the process of the present invention reduces the outage window to a bare minimum, which is invaluable for a high availability environment. Additionally, traditional data archival methods involve a lot of DBA/Developer efforts in terms of identification and archival of data, and rebuilding of indexes and reclamation of space from the table. Since all these activities are part of the optimized archival process of the present invention, DBA/Developer effort is greatly eliminated thus resulting in cost and time savings.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may contain an interface, which may accept commands and data entry from a user. The interface can be, for example, a command line interface, a graphical user interface (GUI), a natural user interface (NUI) or a touch user interface (TUI). The device computer 52 includes a set of internal components 800a and a set of external components 900a, further illustrated in FIG. 5.

Figure 5:
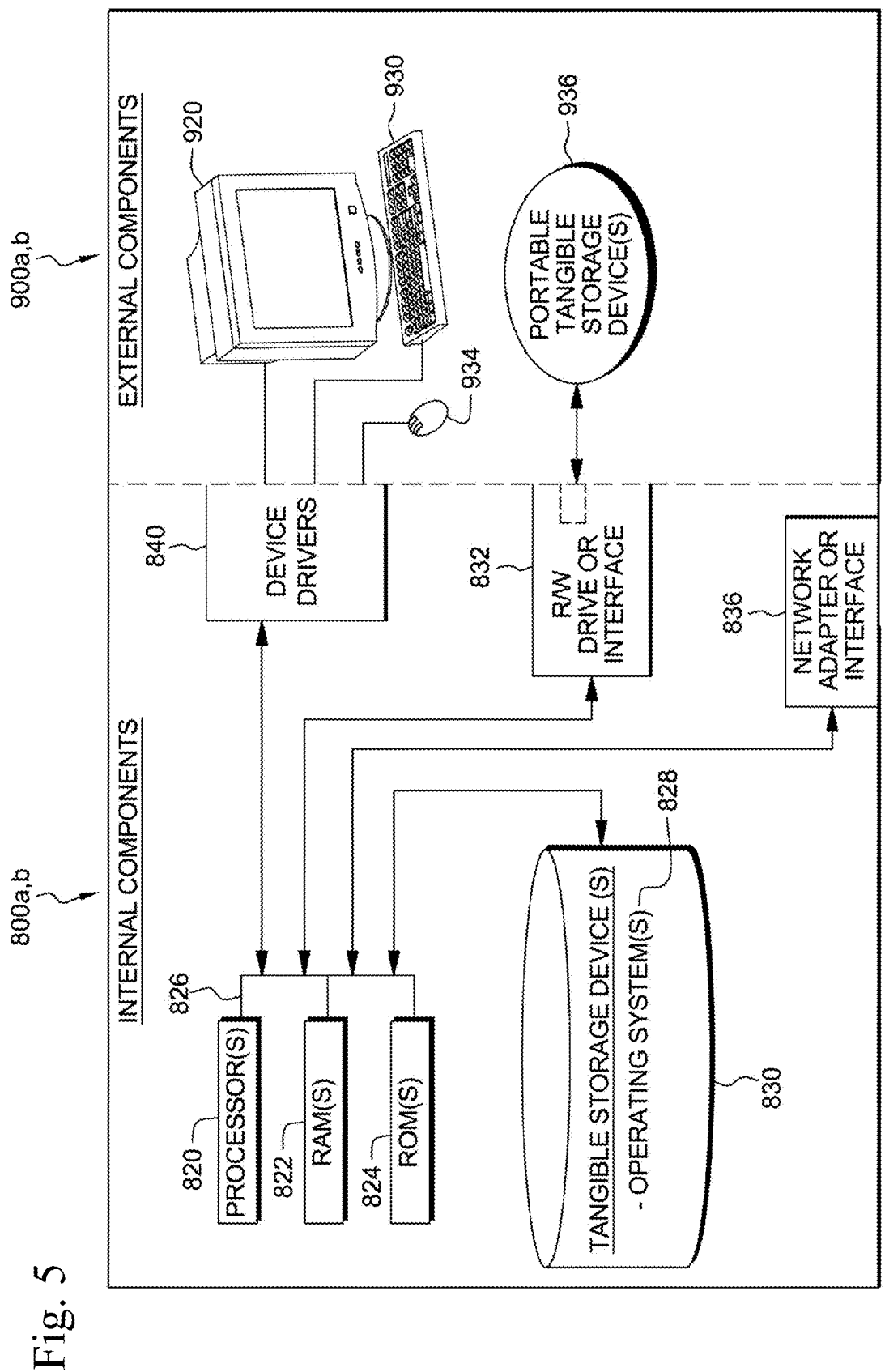
FIG. 5 illustrates internal and external components of a device computer and a server computer in which illustrative embodiments may be implemented.

Server computer 54 includes a set of internal components 800b and a set of external components 900b illustrated in FIG. 5. The server computer may be a database server and more particularly a RDBMS database server. In the depicted example, server computer 54 provides information, such as boot files, operating system images, and applications to the device computer 52. Server computer 54 can compute the information locally or extract the information from other computers on network 50. The server computer 54 may contain an archive program 66.

Figure 2:
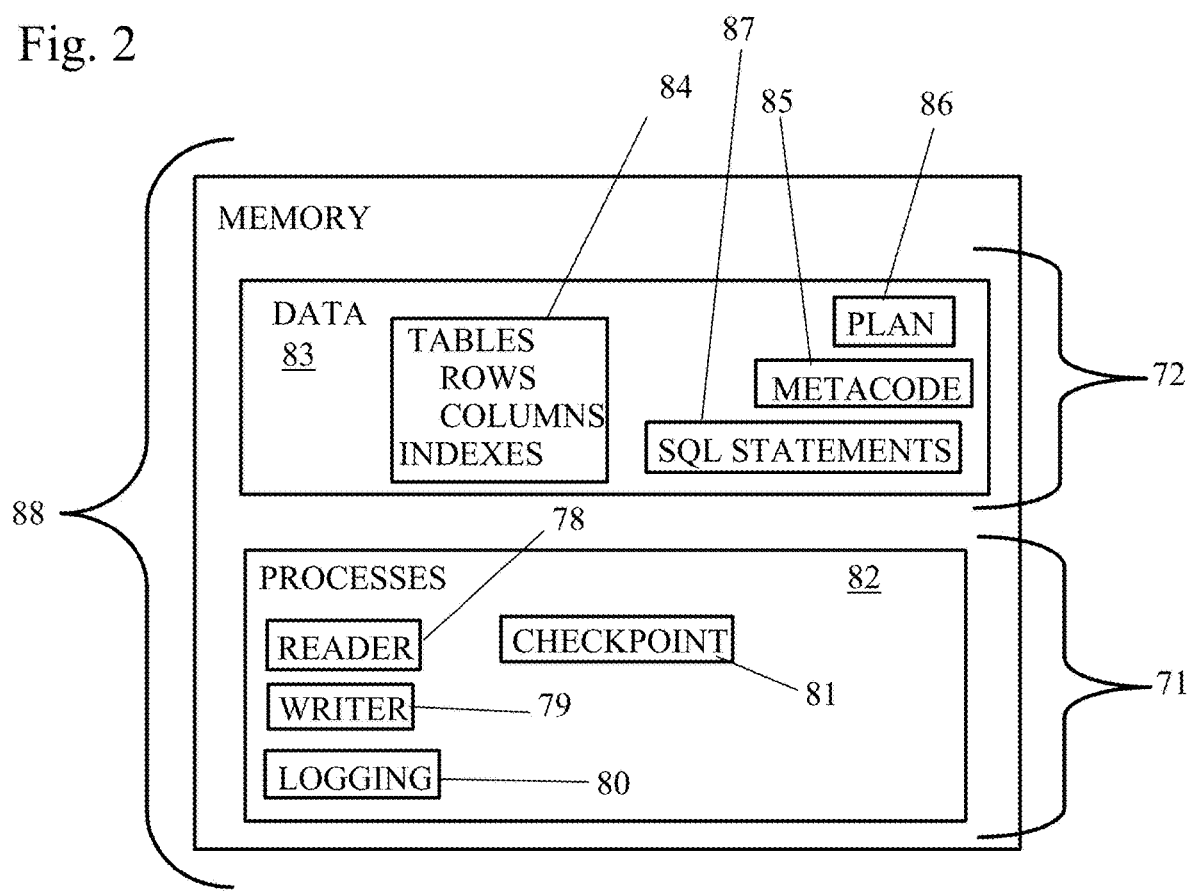
FIG. 2 shows an exemplary diagram of a possible database server of FIG. 1.
Figure 2:
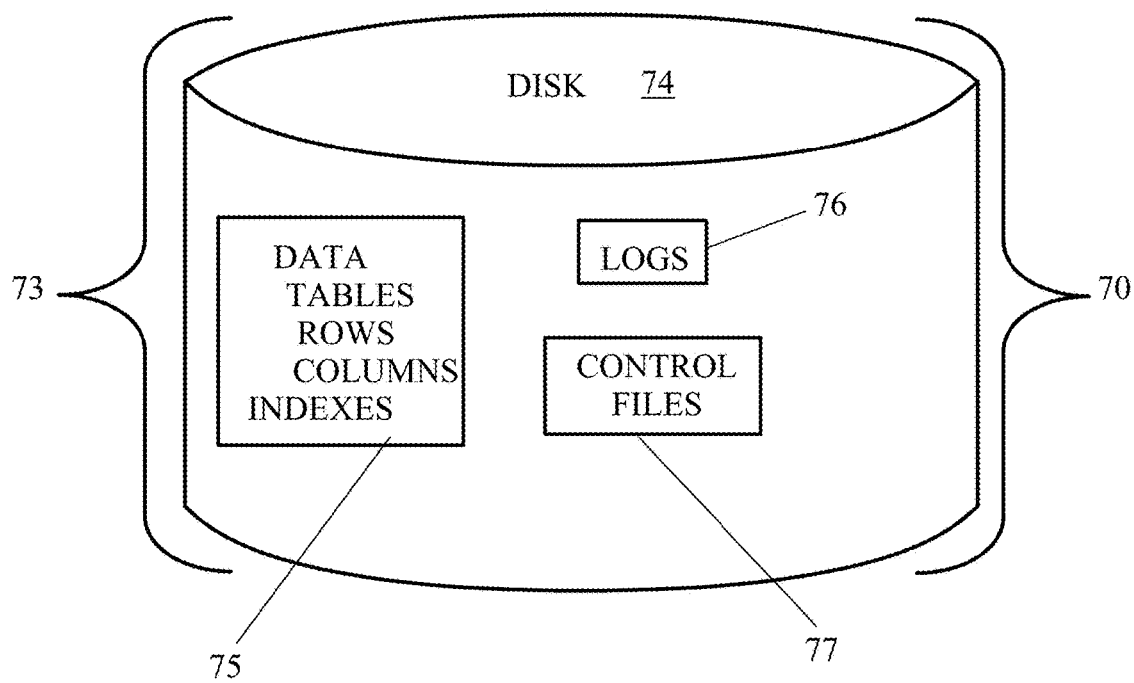

FIG. 2 shows an example of a possible database server of the database server computer 54. The database server computer 54 has instances 88 and a database 73. Each instance 88 has a process model 71 and a memory model 72. The database 73 has a storage model 70.

The storage model 70 includes a database 73. The database 73 has a disk 74 which contains data 75 in tables, rows and columns and indexes. The disk 74 also includes logs 76 and control files 77. It should be noted that archive data will be populated in different table than the primary index, but with same structure as primary table.

The process model 71 includes processes 82 such as reader 78, writer 79, logging 80, and checkpoint 81. It should be noted that the archival process may be carried out by one of the processes of the process model 71.

The memory model 72 includes data 83 in tables 84 with rows and columns which may be indexed. The data 83 may also include metacode 85, plan 86 and SQL statements 87. Business data handled by the memory model 72 remains the same throughout the archival process.

Program code and programs such as the archival program 66 may be stored on at least one of one or more computer-readable tangible storage devices 830 shown in FIG. 5, on at least one of one or more portable computer-readable tangible storage devices 936 as shown in FIG. 5, or on storage unit 53 connected to network 50, or may be downloaded to a computer, such as server computer 54, for use. In other exemplary embodiments, the program code, and programs such as archival program 66 may be stored on at least one of one or more computer-readable storage devices 830 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIGS. 1 and 2 are intended as an example, and not as an architectural limitation, for the different illustrative embodiments.

The present invention speeds up the data archive process by avoiding record level processing by using RDBMS BLOCK level copy.

The following description presents an example of how the method of the invention can be implemented in one embodiment. The example uses a table which stores data regarding stock trades by customers. The table is defined in a Table Definition (Table 1).

Figure 3:
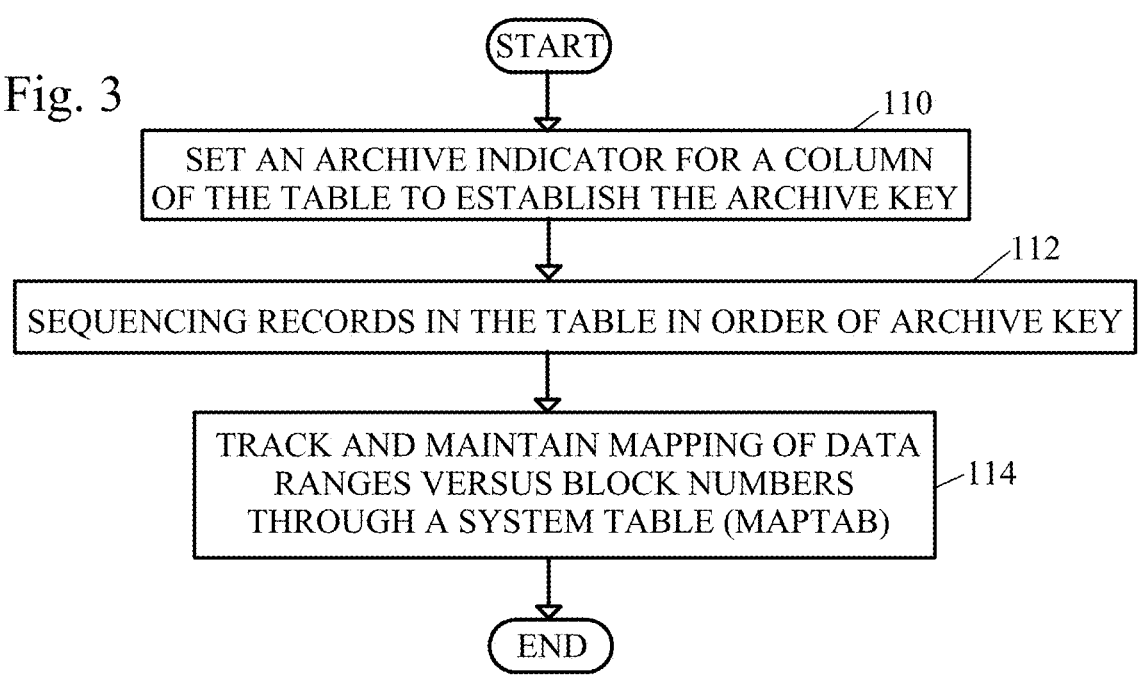
FIG. 3 shows a flow diagram of a method of maintaining records for archiving.

FIG. 3 shows a flow diagram of a method of maintaining records for archiving prior to phase I of the archiving process.

In a first step (step 110), a column of a main or primary table is set with an archive indicator to indicate a portion or block of the main table to be designated for archiving and establish the archive key, for example by the archive program 66. The archive table name to be used during the archival process may also be included with the archive indicator.

Within the table definition is an archive indicator. The archive indicator is a parameter defined at a table level used in conjunction with a column designated as an archive key.

TABLE 1

Example of a Table Definition

| Field | Data Type | Archive Indicator |
|---|---|---|
| CustomerID | CHAR | |
| Stock_Symbol | CHAR | |
| Trade_Date | DATE | Yes |
| Trade_qty | DECIMAL | |
| Trade_price | DECIMAL | |

A field or column in the table identified as an archive key designates data to be archived. For example, referring to Table 1 above, if there is a requirement to archive a transaction date older than 3 months, the archival will have to be done based on date. In this example, TRADE_DATE becomes the archive key. The archive key may be any field or column.

The records of the main table tagged with the archive indicator are stored in order of the archive keys (step 112), for example by the archive program 66.

The infrastructure to leverage block level copy is enabled by specifying an archive key on the object definition which will then ensure that data in the data table is stored in the order of the archive key. For example, as shown in Table 2, the transactions are stored in order by Trade_Date in the data table.

TABLE 2

Example of data table

| Rec. No. | Transaction No | CustomerID | Stock_Symbol | Trade_Date | Trade_qty | Trade_price |
|---|---|---|---|---|---|---|
| 101 | 1001 | MVL1 | BAC | 2015 Jan. 1 | 10 | 13.625 |
| 102 | 6202 | TSW2 | SIRI | 2015 Jan. 4 | 15 | 3.95 |
| 103 | 0035 | JAF5 | AMD | 2015 Jan. 10 | 100 | 5.02 |
| 104 | 2014 | CAM1 | MU | 2015 Jan. 10 | 55 | 12.72 |
| 105 | 0105 | LMW3 | S | 2015 Feb. 1 | 3 | 4.38 |
| 106 | 5006 | LSG88 | QEP | 2015 Feb. 3 | 50 | 18.23 |
| ... | ... | ... | ... | ... | ... | ... |
| 65813 | 3548 | MFB2 | FCX | 2016 Jun. 22 | 10 | 11.49 |

The data is stored or sequenced in archive key order within the data table, ensuring easy mapping between archive key ranges and corresponding block ranges. For an existing data table, where the archive indicator was not enabled at the time of table creation, a one-time data reorganization is carried out to sequence the data in the archive key order. The archive key order of the data will automatically be maintained for further updates from that point forward.

Based on the records of the main table or data table that are tagged, a system mapping table is created which may be controlled by the archive program 66 to track and maintain mapping of data ranges versus block numbers (step 114).

The system mapping table tracks and maintains a mapping of data ranges versus block numbers as shown in Table 3. This can be done by creating a table, as part of the database metacode creation, called, for example, <TBNAME>.MAPTAB. The mapping table maintains a list of archive key ranges and corresponding block ranges which will be referenced at the time of archival to copy qualifying blocks of data to an archive table.

The system mapping table stores ranges of data and blocks and is updated only when an inserted value in a block or page falls outside of the present highest and lowest archive key ranges. The system mapping table may be implemented as an index only table. The system mapping table may also store block number/page number as an alternative to block ranges as shown in Table 3. A low key value and a high key value may be created when a new block or page is created and closed when a subsequent block is added. For heavy inserts that end up on the same block or page, there is going to be a certain degree of locking overhead. With chronology based keys that are ever ascending, only the high key value is likely to get updated with new inserts. If the same key (e.g. date) is repeated, no updates take place, to aid in alleviating the locking issues associated with heavy inserts.

If one wishes to archive data corresponding to the month of January 2015, it can be ascertained by reading the system mapping table, MAPTAB, that the first 3 blocks contain the requisite data.

For RDBMS where data is stored in contiguous blocks (increasing block ranges), the entries on the system mapping table may be consolidated for multiple blocks (eg. a single entry for every 20 blocks) to limit the amount of update activity on the system table. For RDBMS where blocks are stored in a heap, block numbers may be random and not contiguous, and the data ranges may have to be sealed at every block boundary as given in the example shown in Table 4.

The steps of 112-114 are repeated until a request to archive the data based on the archive key is received and Phase I of the archive process is entered.

Figure 4:
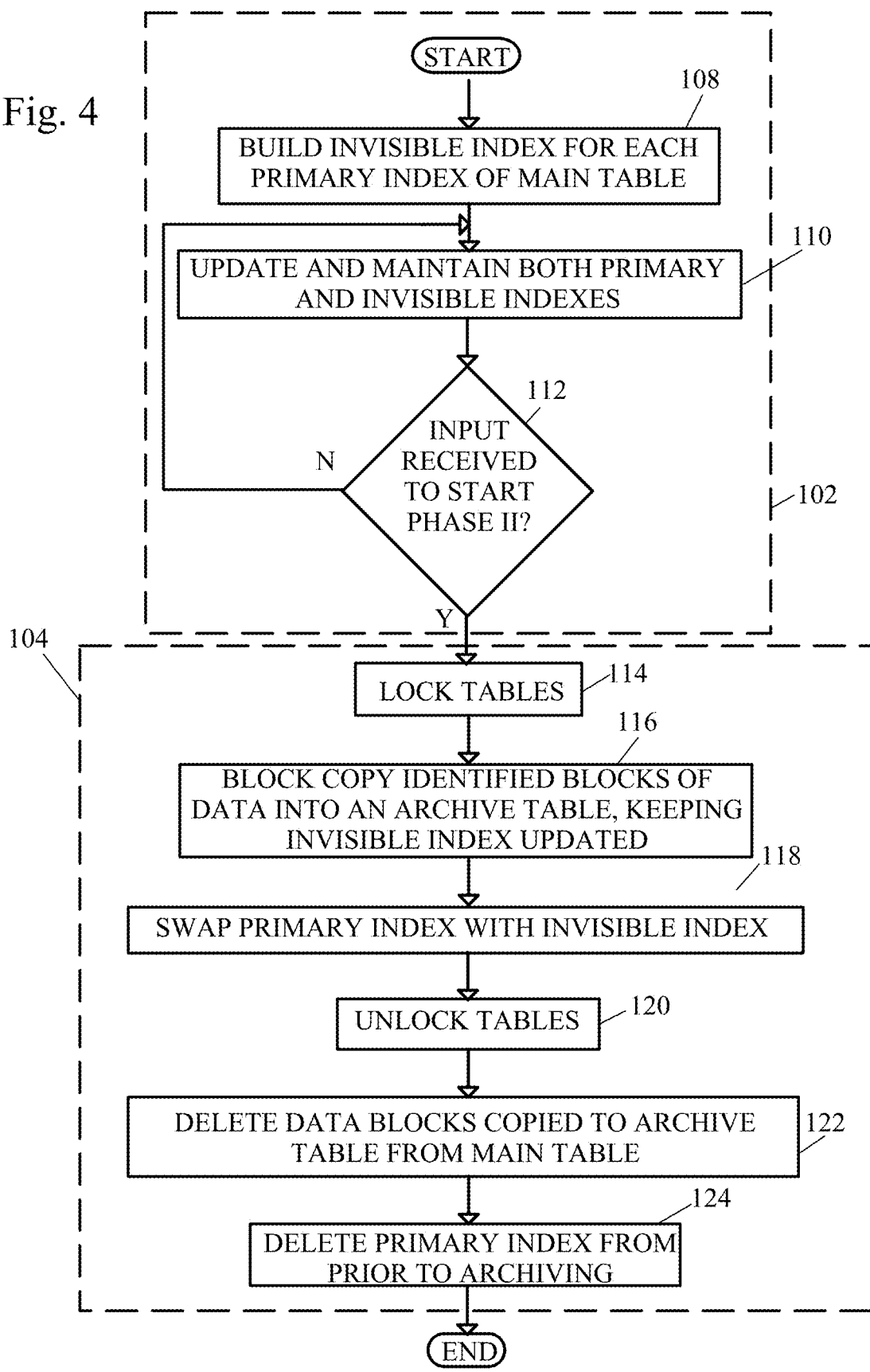
FIG. 4 shows a flow diagram of a method of archiving RDBMS data using block level copy.

Referring to FIG. 4, to reduce the outage window (the time during which the database is not available), the optimized archive process of the present invention works in two phases: Phase I of invisible index build 102 and Phase II of block copy 104.

Upon receiving a request to archive data, which might be a manual input or an automatic trigger based on a time set by a maintenance schedule, the system starts Phase I of the method (preparation for archiving).

An "invisible index" is created for each existing primary index (step 108), for example by the archive program 66. The invisible index is initially built by accounting for the data that will be retained after the archival process and is maintained continuously as the table experiences new updates. In other words, the invisible index does not contain pointers to data that is going to be archived.

An example of a primary index is shown in Table 5 and an example of an invisible index is shown in Table 6.

TABLE 3

Mapping Table

| Block No. | Low Key Value | High Key Value |
|---|---|---|
| 1 | 2015 Jan. 1 | 2015 Jan. 10 |
| 2 | 2015 Jan. 10 | 2015 Jan. 10 |
| 3 | 2015 Jan. 10 | 2015 Jan. 31 |
| 4 | 2015 Feb. 1 | 2015 Feb. 5 |

With this example, then, at the time the table of Table 2 is to be archived, based on the mapping table, the data is divided into blocks as follows in Table 4:

TABLE 4

Example of data table, with block numbers

| Rec. No. | Transaction No | Customer ID | Stock_Symbol | Trade_Date | Trade_qty | Trade_price | Block |
|---|---|---|---|---|---|---|---|
| 101 | 1001 | MVL1 | BAC | 2015 Jan. 1 | 10 | 13.625 | 1 |
| 102 | 6202 | TSW2 | SIRI | 2015 Jan. 4 | 15 | 3.95 | |
| 103 | 0035 | JAF5 | AMD | 2015 Jan. 10 | 100 | 5.02 | 2 |
| 104 | 2014 | CAM1 | MU | 2015 Jan. 10 | 55 | 12.72 | |
| 105 | 0105 | LMW3 | S | 2015 Feb. 1 | 3 | 4.38 | 4 |
| 106 | 5006 | LSG88 | QEP | 2015 Feb. 3 | 50 | 18.23 | |
| ... | ... | ... | ... | ... | ... | ... | |
| 65813 | 3548 | MFB2 | FCX | 2016 Jun. 22 | 10 | 11.49 | N |

TABLE 5

Primary Index by Transaction No.
Primary Index

| Transaction No. | Pointer to Record No. |
|---|---|
| 0035 | 103 |
| 0036 | 65165 |
| 0105 | 105 |
| 0300 | 6546 |
| 1001 | 101 |
| 1006 | 5411 |
| 2014 | 104 |
| 3548 | 65813 |

TABLE 5-continued

Primary Index by Transaction No.
Primary Index

| Transaction No. | Pointer to Record No. |
|---|---|
| 5006 | 106 |
| 5206 | 46546 |
| 6202 | 102 |
| ... | ... |

Invisible indexes are maintained like normal indexes but are marked as invisible. Once they are created, the invisible indexes are kept updated along with the primary index, whenever any inserts, updates, or deletes, happen on the associated table.

An example of the primary and invisible indexes of Phase I is shown in Table 6.

The invisible index and primary indexes are updated and maintained in parallel (step 110) while the system waits for a trigger to initiate Phase II (the archiving of data). The invisible index only contains active data that will be retained in the main table after the archival process.

That is, during Phase I, when data is inserted into or deleted from a table, both the primary and the invisible indexes are updated. For high volume deletes or inserts (load) of data, the index update process is completed by an Index rebuild, in which case both the primary and invisible indexes would be rebuilt. During this time, the table is unavailable for access.

TABLE 6

Primary Index and Invisible Index at start of Phase I

| Primary Index | | Invisible Index | |
|---|---|---|---|
| Transaction No. | Pointer to Record No. | Transaction No. | Pointer to Record No. |
| 0035 | 103 | | |
| 0036 | 65165 | 0036 | 65165 |
| 0105 | 105 | 0105 | 105 |
| 0300 | 6546 | 0300 | 6546 |
| 1001 | 101 | | |
| 1006 | 5411 | 1006 | 5411 |
| 2014 | 104 | | |
| 3548 | 65813 | 3548 | 65813 |
| 5006 | 106 | 5006 | 106 |

TABLE 6-continued

Primary Index and Invisible Index at start of Phase I

| Primary Index | | Invisible Index | |
|---|---|---|---|
| Transaction No. | Pointer to Record No. | Transaction No. | Pointer to Record No. |
| 5206 | 46546 | 5206 | 46546 |
| 6202 | 102 | | |
| ... | ... | ... | ... |

If the system does not receive a trigger to initiate Phase II (step 112), the system returns to step 110 of updating and maintaining the invisible index and primary indexes.

It should be noted that if the archival process encounters an abnormal condition in phase I, invisible indexes are dropped and the archive process terminates.

If the system receives a trigger to initiate Phase II (step 112), the data table is locked in exclusive (read only) mode (step 114), so that the data in the table does not change during the archiving. The primary indexes can continue to be used during this time to access the data in the table for "read only" access.

TABLE 7

Primary Index and Invisible Index during Phase II

| Primary Index | | Invisible Index | |
|---|---|---|---|
| Transaction No. | Pointer to Record No. | Transaction No. | Pointer to Record No. |
| 0035 | 103 | | |
| 0036 | 65165 | 0036 | 65165 |
| 0105 | 105 | 0105 | 105 |
| 0300 | 6546 | 0300 | 6546 |
| 1001 | 101 | | |
| 1006 | 5411 | 1006 | 5411 |
| 2014 | 104 | | |
| 3548 | 65813 | 3548 | 65813 |
| 5006 | 106 | 5006 | 106 |
| 5206 | 46546 | 5206 | 46546 |
| 6202 | 102 | | |
| ... | ... | ... | ... |

The high speed archival process copies the identified blocks of data and appends the copied blocks of data to an archive table (step 116), for example by an archive program 66. During this process, the invisible index is kept updated with the primary table data which is going to be retained after the archival process as shown in Table 7. Examples of the archive table after the block copy is shown in Table 8. Note that in this example, record numbers in the archive table are prefixed with the letter "A" for explanatory purposes.

TABLE 8

Archive table after Phase II

| Rec. No. | Transaction No | CustomerID | Stock_Symbol | Trade_Date | Trade_qty | Trade_price |
|---|---|---|---|---|---|---|
| A101 | 1001 | MVL1 | BAC | 2015 Jan. 1 | 10 | 13.625 |
| A102 | 6202 | TSW2 | SIRI | 2015 Jan. 4 | 15 | 3.95 |
| A103 | 0035 | JAF5 | AMD | 2015 Jan. 10 | 100 | 5.02 |
| A104 | 2014 | CAM1 | MU | 2015 Jan. 10 | 55 | 12.72 |

Then, the old primary index is dropped and invisible index is made visible which contains only active data (step 118).

Then, the tables are unlocked (step 120), for example by the archive program 66.

The data in the main data table which was copied to the archival table is then deleted from the main table (step 122). An example of the data table after the archived data has been removed from the main table is shown in Table 9.

TABLE 9

Data table after Phase II

| Rec. No. | Transaction No | CustomerID | Stock_Symbol | Trade_Date | Trade_qty | Trade_price |
|---|---|---|---|---|---|---|
| 101 | 0105 | LMW3 | S | 2015 Feb. 1 | 3 | 4.38 |
| 102 | 5006 | LSG88 | QEP | 2015 Feb. 3 | 50 | 18.23 |
| ... | ... | ... | ... | ... | ... | ... |
| 42183 | 3548 | MFB2 | FCX | 2016 Jun. 22 | 10 | 11.49 |

The old primary index, containing archived and unarchived (active) data, can now be deleted (124) as shown in FIG. 4.

An example of the new primary index is shown in Table 10.

TABLE 10

Primary Index after end of Phase II
Primary Index

| Transaction No. | Pointer to Record No. |
|---|---|
| 0036 | 6505 |
| 0105 | 101 |
| 0300 | 6546 |
| 1006 | 5411 |
| 3548 | 42183 |
| 5006 | 102 |
| 5206 | 16016 |
| ... | ... |

Prior to the method ending, the space in the table occupied by the deleted data can be marked for reuse, or the table can be compressed to eliminate the space formerly occupied by the deleted data, as is common in the art.

If the archival process encounters an abnormal condition in phase II, copied blocks of data in the archive table are dropped. A high water mark of the main data table is not reset and the invisible indexes are dropped.

If an index is required for the archive table, the index may be built manually outside of the archive process. The index for the archive table may or may not match the index of the main table.

For example, considering a main table of size 150 GB (19.6 million 8K blocks) containing five multiple composite Indexes each occupying about a third of the space occupied by the main table. The total space of the object is 150+ (5*50)=400 GB. If there is a requirement to archive data, that corresponds to approximately 75 GB.

In the prior art, if the above main table is a partitioned table, for one partition, time is required to detach partition, for example through an exchange command, and attach the corresponding data store to a designated archive data store, where the time taken would be 10-15 mins. This feature of detaching and reattaching partitions is not present in RDBMS.

In the prior art, for multiple partitions, the same process has to be repeated with related manual efforts. If it is a non-partitioned main table, the time required to unload data that meet archive criteria at a record level and load archived data into a designated archive data store, as well as data deletion and de-fragmentation on the main or source table is one hour. Then, an index rebuild may need to take place. For a typical index of size 50 GB, the rebuild may take 30-45 minutes with or without parallelism. A full table scan is required for each of the global Indexes. If all the indexes are being rebuilt in parallel, there is a minimum outage of 30-45 minutes.

Therefore, the total time spend is between one hour and one hour forty-five minutes for the archiving process of the prior art. It should be noted that time may vary for each archival process depending upon the size of the table.

In the present invention, for the same main table described above, with the invisible indexes being built prior to the archiving process and block level parallel copy of data from source to an archive data store being used, such that during a predetermined outage window, the existing indexes will be swapped with the invisible indexes, results in an outage window of 5-10 minutes overall. The archival process of the present invention may be integrated into RDBMS kernel mechanism, with the archival achieved with high availability (by leveraging invisible indexes) drastically reducing outage times, exploiting RDBMS block level copies, and resetting the high water mark immediately to eliminate defragmentation requirements.

FIG. 5 illustrates internal and external components of a device computer 52 and a server computer 54 in which illustrative embodiments may be implemented. In FIG. 5, a device computer 52 and a server computer 54 may include respective sets of internal components 800a, 800b, and external components 900a, 900b. It should be noted that the server computer 54 may also include the components of FIG. 2. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and archive program 66 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Archive program 66 can be stored on one or more of the portable computer-readable tangible storage devices 936, read via R/W drive or interface 832 and loaded into hard drive 830.

Each set of internal components 800*a*, 800*b* also includes a network adapter or interface 836 such as a TCP/IP adapter card. Archive program 66 can be downloaded to the device computer 52 and server computer 54 from an external computer via a network (for example, the Internet, a local area network or other, wide area network) and network adapter or interface 836. From the network adapter or interface 836, archive program 66 is loaded into hard drive 830. Archive program 66 can be downloaded to the server computer 54 from an external computer via a network (for example, the Internet, a local area network or other, wide area network) and network adapter or interface 836. From the network adapter or interface 836, archive program 66 is loaded into hard drive 830. The network may comprise copper wires, optical fibers, wireless transmission, routers, firewalls, switches, gateway computers and/or edge servers.

Each of the sets of external components 900*a*, 900*bc* includes a computer display monitor 920, a keyboard 930, and a computer mouse 934. Each of the sets of internal components 800*a*, 800*b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Archive program 66 can be written in various programming languages including low-level, high-level, object-oriented or non object-oriented languages. Alternatively, the functions of an archive program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of archiving data through an archive process in a relational database management system, the archive process comprising the steps of:
   a computer setting an archive indicator and an archive key for a column of a data table within the relational database management system;
   the computer storing records of the data table with the archive indicator in order of the archive key;
   the computer tracking and maintaining mapping of data ranges versus block numbers through a system mapping table, referenced at a time of archival, to copy qualifying blocks of data to an archive table, the system mapping table storing ranges of data and blocks, which are updated when an inserted value in a block falls outside of a present highest and lowest archive key ranges, wherein a data range table is created within the system mapping table to track and maintain the mapping of the data ranges versus block numbers;
   the computer creating an invisible index for each primary index of the data table by copying data from the data table of the primary indexes that will not be archived, wherein the invisible index is unmarked, created prior to archiving, and reduces an outage window;
   the computer updating both the primary index and invisible indexes based on changes to the data table until an input is received to initiate a block copy of data to be archived;
   the computer receiving an input to initiate block copy of data to be archived;
   the computer locking the data tables;
   the computer block copying identified blocks of data from the data table to the archive table and updating the invisible index to correspond to the data table;
   the computer swapping the primary index with the invisible index;
   the computer unlocking the data tables;
   the computer deleting data blocks from a main table which were copied into the archival table; and
   the computer deleting the primary index in which the invisible index was created from prior to archiving.

2. The method of claim 1, wherein the identified blocks of the main table being block level copied correspond to a partition of the main table.

3. The method of claim 1, further comprising the computer compressing the main table to eliminate the space formerly occupied by the deleted data blocks.

4. The method of claim 1, in which the archive process is started at a time established by a maintenance schedule.

5. A computer program product for archiving data through an archive process in a relational database management system, a computer comprising at least one processor, one or more memories, one or more computer readable storage media, the computer program product comprising a computer readable storage medium having program instructions embodied therewith, the program instructions executable by the computer to perform a method of the archive process comprising:
   setting, by the computer setting an archive indicator and an archive key for a column of a data table within the relational database management system;
   storing, by the computer, records of the data table with the archive indicator in order of the archive key;
   tracking and maintaining mapping, by the computer, of data ranges versus block numbers through a system mapping table, referenced at a time of archival, to copy qualifying blocks of data to an archive table, the system mapping table storing ranges of data and blocks, which are updated when an inserted value in a block falls outside of a present highest and lowest archive key ranges, wherein a data range table is created within the system mapping table to track and maintain the mapping of the data ranges versus block numbers;
   creating, by the computer, an invisible index for each primary index of the data table by copying data from the data table of the primary indexes that will not be archived, wherein the invisible index is unmarked, created prior to archiving and reduces an outage window;
   updating, by the computer, both the primary index and invisible indexes based on changes to the data table until an input is received to initiate a block copy of data to be archived;
   receiving, by the computer, an input to initiate block copy of data to be archived;
   locking, by the computer, the data tables;
   block copying, by the computer, identified blocks of data from the data table to an archive table and updating the invisible index to correspond to the data table;
   replacing, by the computer, the primary index with the invisible index;
   unlocking, by the computer, the data tables;
   deleting, by the computer, data blocks from a main table which was copied into the archival table; and
   deleting, by the computer, the primary index in which the invisible index was created from prior to archiving.

6. The computer program product of claim 5, wherein the identified blocks of the main table being block level copied correspond to a partition of the main table.

7. The computer program product of claim 5, further comprising compressing, by the computer, the main table to eliminate the space formerly occupied by the deleted data blocks.

8. The computer program product of claim 5, in which the program instructions are started at a time established by a maintenance schedule.

9. A computer system for archiving data through an archive process in a relational database management system comprising a computer comprising at least one processor, one or more memories, one or more computer readable storage media having program instructions executable by the computer to perform the program instructions of the archive process comprising:
- setting, by the computer setting an archive indicator and an archive key for a column of a data table within the relational database management system;
- storing, by the computer, records of the data table with the archive indicator in order of the archive key;
- tracking and maintaining mapping, by the computer, of data ranges versus block numbers through a system mapping table, referenced at a time of archival, to copy qualifying blocks of data to an archive table, the system mapping table storing ranges of data and blocks, which are updated when an inserted value in a block falls outside of a present highest and lowest archive key ranges, wherein a data range table is created within the system mapping table to track and maintain the mapping of the data ranges versus block numbers;
- creating, by the computer, an invisible index for each primary index of the data table by copying data from the data table of the primary indexes that will not be archived, wherein the invisible index is unmarked, created prior to archiving and reduces an outage window;
- updating, by the computer, both the primary index and invisible indexes based on changes to the data table until an input is received to initiate a block copy of data to be archived;
- receiving, by the computer, an input to initiate block copy of data to be archived;
- locking, by the computer, the data tables;
- block copying, by the computer, identified blocks of data from the data table to an archive table and updating the invisible index to correspond to the data table;
- replacing, by the computer, the primary index with the invisible index;
- unlocking, by the computer, the data tables;
- deleting, by the computer, data blocks from a main table which was copied into the archival table; and
- deleting, by the computer, the primary index in which the invisible index was created from prior to archiving.

10. The computer system of claim 9, wherein the identified blocks of the main table being block level copied correspond to a partition of the main table.

11. The computer system of claim 9, further comprising compressing, by the computer, the main table to eliminate the space formerly occupied by the deleted data blocks.

12. The method of claim 1, wherein the archive process of archiving data in the relational database management system has the outage window of ten minutes or less.

13. The method of claim 1, wherein the archive process includes rebuilding indexes associated with all data tables within the relational database management system.

14. The method of claim 1, wherein the archive process is integrated into a kernel mechanism of the relational database management system.

15. The computer program product of claim 5, wherein the archive process of archiving data in the relational database management system has the outage window of ten minutes or less.

16. The computer program product of claim 15, wherein the archive process includes rebuilding indexes associated with all data tables within the relational database management system.

17. The computer program product of claim 5, wherein the archive process is integrated into a kernel mechanism of the relational database management system.

18. The computer system of claim 9, wherein the archive process of archiving data in the relational database management system has the outage window of ten minutes or less.

19. The computer system of claim 18, wherein the archive process includes rebuilding indexes associated with all data tables within the relational database management system.

20. The computer system of claim 9, wherein the archive process is integrated into a kernel mechanism of the relational database management system.

* * * * *